United States Patent
Loftus, Jr. et al.

(10) Patent No.: US 9,611,023 B2
(45) Date of Patent: Apr. 4, 2017

(54) OUTBOARD MOTOR FOR A WATERCRAFT AND METHODS OF USE AND MANUFACTURE THEREOF

(71) Applicant: Honda Motor Co., Ltd., Tokyo (JP)

(72) Inventors: James A. Loftus, Jr., Marysville, OH (US); Christopher Kurt Zingelmann, Jr., Raleigh, NC (US)

(73) Assignee: HONDA MOTOR CO., LTD., Tokyo (JP)

( * ) Notice: Subject to any disclaimer, the term of this patent is extended or adjusted under 35 U.S.C. 154(b) by 171 days.

(21) Appl. No.: 14/752,479

(22) Filed: Jun. 26, 2015

(65) Prior Publication Data

US 2016/0375974 A1 Dec. 29, 2016

(51) Int. Cl.
*B63H 20/14* (2006.01)
*B63H 20/20* (2006.01)
*F16H 57/02* (2012.01)

(52) U.S. Cl.
CPC ............. *B63H 20/14* (2013.01); *B63H 20/20* (2013.01); *F16H 2057/0203* (2013.01); *F16H 2057/02043* (2013.01)

(58) Field of Classification Search
CPC ........ B63H 20/00; B63H 20/10; B63H 20/12; B63H 20/14; B63H 20/20; B63H 20/32; B63H 2020/323; B63H 2020/326; F16H 57/02; F16H 2057/0203; F16H 2057/02043; F16H 57/038
USPC ......................................... 440/75, 79, 84, 86
See application file for complete search history.

(56) References Cited

U.S. PATENT DOCUMENTS

| | | | |
|---|---|---|---|
| 2,982,272 A * | 5/1961 | Stucke | F01B 15/007 123/59.3 |
| 4,559,018 A * | 12/1985 | Nakahama | B63H 20/14 248/642 |
| 5,088,946 A * | 2/1992 | Nakayama | B63H 20/10 248/640 |
| 6,196,887 B1 | 3/2001 | Ogasawara | |
| 7,413,491 B2 | 8/2008 | Kawamoto | |
| 7,727,037 B2 | 6/2010 | Fukuoka et al. | |
| 8,109,800 B2 | 2/2012 | Okabe et al. | |
| 8,333,626 B2 | 12/2012 | Daikoku | |

(Continued)

OTHER PUBLICATIONS

Richardson, Aaron, 'Video: Seven Marine uses Cadillac CTS-V engines in outboard motors', Autoblog, Mar. 12, 2011.

*Primary Examiner* — Ajay Vasudeva
(74) *Attorney, Agent, or Firm* — Kenealy Vaidya LLP

(57) ABSTRACT

Some embodiments are directed to a transmission that includes an input shaft connected to a crankshaft, an output shaft contained within a transmission housing, an input gear contained within the transmission housing and connected to the input shaft, and an output gear contained within the transmission housing and connected to the output shaft and engaging the input gear. A directional gear assembly is contained within the transmission housing at a location between the output shaft and the drive shaft. The directional gear assembly includes a first configuration in which the output shaft drives the drive shaft in a first rotational direction, a second configuration in which the output shaft drives the drive shaft in a second rotational direction that is opposite to the first rotational direction, and a third configuration in which the drive shaft is disconnected from the output shaft.

20 Claims, 5 Drawing Sheets

(56) References Cited

U.S. PATENT DOCUMENTS

| | | |
|---|---|---|
| 8,460,041 B2 | 6/2013 | Davis et al. |
| 8,662,945 B2 | 3/2014 | Blomdahl |
| 9,126,666 B2 * | 9/2015 | Davis .................... B63H 20/14 |
| 2013/0210295 A1 | 8/2013 | Davis et al. |
| 2013/0260621 A1 | 10/2013 | Davis et al. |
| 2013/0267134 A1 | 10/2013 | Davis et al. |
| 2013/0273792 A1 | 10/2013 | Davis et al. |
| 2014/0038478 A1 | 2/2014 | Foreman |
| 2014/0179179 A1 | 6/2014 | Blomdahl |
| 2014/0187107 A1 | 7/2014 | Gemin et al. |

\* cited by examiner

# OUTBOARD MOTOR FOR A WATERCRAFT AND METHODS OF USE AND MANUFACTURE THEREOF

BACKGROUND

The disclosed subject matter relates to the drive assembly of outboard motors for watercraft, and methods of use and manufacture thereof. More particularly, the disclosed subject matter relates to methods and apparatus that transfer drive torque generated by the internal combustion to the propeller of an outboard motor.

Related art watercraft can include a drive assembly configured in one of at least three different layouts: inboard motor (also referred to as an inboard drive), outboard motor (also referred to as an outboard drive), and inboard/outboard motor (also referred to as an I/O, or as a stern drive). Each of these drive assembly layouts can include advantage(s) and disadvantage(s) as compared to the other layouts and can be selected based on performance, maintenance, cost and/or any other appropriate targets set for the watercraft.

An outboard motor can include an internal combustion engine and other components, such as but not limited to a pair of bevel gears, a drive shaft, a propeller shaft, and a forward-neutral-reverse assembly. The outboard motor can be assembled as a self-contained unit. The outboard motor can be removably mounted to the transom to be positioned completely outside the hull of the watercraft. As a result, an outboard motor can provide easy maintenance of the drive assembly and can enhance or maximize space for passengers and cargo for a given hull size, as compared to an inboard layout or an inboard/outboard layout. Further still, an outboard motor can omit the vapor ventilation system of the inboard motor and the inboard/outboard motor.

The outboard motor can be mounted to the transom to pivot relative to the transom in order to steer the watercraft. Thus, a separate steering system can be omitted, as compared to an inboard motor. Further, the outboard motor can permit the entire drive assembly to pivot relative to the transom about a substantially horizontal axis. As a result, the trim angle of the drive assembly can be adjusted to lift the bow out of the water to enhance acceleration or operation in rough water conditions, or to maintain the hull substantially parallel to the water surface during steady cruising conditions in relatively calm waters.

In an outboard motor, the internal combustion engine is spaced a predetermined distance from the propeller shaft to which the propeller is attached. In order to reduce or minimize the number of components used in the drive assembly, the internal combustion engine is mounted with its crankshaft oriented substantially perpendicular to the propeller shaft. For example, the engine can be oriented so that the crankshaft extends in a substantially vertical direction, and the propeller shaft extends in a substantially horizontal direction. The crankshaft can be connected to the propeller shaft using a driveshaft and a pair of bevel gears.

SUMMARY

However, the related art outboard motors are subject to various disadvantages. For example, various components may only be suitable for use in outboard motors, and in particular one or more components of an internal combustion engine originally designed for use in a land vehicle can be incompatible with the crankshaft orientation utilized in an outboard motor.

In another example, the outboard motor can include a transmission that includes one or more speed ratios. Typically, the transmission is mounted between the engine and the propeller shaft. If it is desired to change the speed ratio(s) of the transmission, then the transmission must be removed from the rest of the outboard motor and then re-assembled after changing the speed ratio(s). This procedure can be labor intensive.

In yet another example, the outboard motor can include a forward-neutral-reverse assembly that can drive the propeller in a first direction that propels the watercraft in a forward direction that can drive the propeller in a second direction that propels the watercraft in a reverse direction, and that can disconnect the propeller from the engine crankshaft. Typically, the forward-neutral-reverse assembly engages the propeller shaft, and is usually submerged in the water during operation of the outboard motor. Further, the forward-neutral-reverse assembly can adversely impact the size of the lower portion of the outboard motor, such that drag on the outboard motor can be relatively high as the watercraft moves through the body of water. This relatively high drag can result in undesirable fuel consumption and/or performance of the outboard motor.

It may therefore be beneficial to provide an outboard motor that addresses at least one of the above and/or other disadvantages of the related art.

Some embodiments are therefore directed to an outboard motor for propelling a watercraft along a body of water. The outboard motor can include: a propeller including at least one blade configured to impart thrust to an immediate portion of the body of water if the propeller rotates in the immediate portion of the body of water; a propeller shaft fixed to the propeller and extending in a first direction; an output shaft extending substantially perpendicular to the first direction and selectively driving the propeller shaft; an internal combustion engine including an engine block and a crankshaft axis, the crankshaft axis extends substantially parallel to the first direction; and The outboard also can include a transmission including: a transmission housing abutting the engine block; a first shaft extending substantially parallel to the first direction, and contained within the transmission housing; a second shaft extending substantially parallel to the first direction and contained within the transmission housing; a first gear contained within the transmission housing and connected to the first shaft; a second gear contained within the transmission housing and connected to the second shaft and engaging the first gear; and a directional gear assembly contained within the transmission housing at a location between the second shaft and the output shaft, the directional gear assembly including a first configuration in which the second shaft drives the output shaft in a first rotational direction, a second configuration in which the second shaft drives the output shaft in a second rotational direction that is opposite to the first rotational direction, and a third configuration in which the output shaft is disconnected from the second shaft.

Some other embodiments are directed to a transmission for use with an outboard motor for propelling a watercraft along a body of water, the outboard motor including a propeller including at least one blade configured to impart thrust to an immediate portion of the body of water if the propeller rotates in the immediate portion of the body of water, a propeller shaft fixed to the propeller and extending in a first direction, an output shaft extending substantially perpendicular to the first direction and selectively driving the propeller shaft, and an internal combustion engine including a crankshaft axis extending substantially parallel to the first direction.

The transmission can include: a transmission housing configured to abut the internal combustion engine; a first shaft configured to be driven by the internal combustion engine, extending substantially parallel to the first direction, and contained within the transmission housing; a second shaft extending substantially parallel to the first direction and contained within the transmission housing; a first gear contained within the transmission housing and connected to the first shaft; a second gear contained within the transmission housing, connected to the second shaft, and engaging the first gear; and a directional gear assembly contained within the transmission housing at a location between the second shaft and the output shaft, the directional gear assembly including a first configuration in which the second shaft drives the output shaft in a first rotational direction, a second configuration in which the second shaft drives the output shaft in a second rotational direction that is opposite to the first rotational direction, and a third configuration in which the output shaft is disconnected from the second shaft.

Still other embodiments are directed to a method of manufacturing an outboard motor for propelling a watercraft along a body of water. The method can include: providing a propeller including at least one blade configured to impart thrust to an immediate portion of the body of water if the propeller rotates in the immediate portion of the body of water; fixing a propeller shaft to the propeller; extending the propeller shaft in a first direction; extending an output shaft substantially perpendicular to the first direction; providing an internal combustion engine including an engine block and a crankshaft axis; orienting the crank shaft axis to be substantially parallel to the first direction; abutting a transmission housing against the engine block; connecting a first shaft to the internal combustion engine, such that the first shaft extends substantially parallel to the first direction, and is contained within the transmission housing; extending a second shaft substantially parallel to the first direction and so as to be contained within the transmission housing; providing a first gear so as to be contained within the transmission housing and connected to the first shaft; providing a second gear so as to be contained within the transmission housing and connected to the second shaft and engaged with the first gear; and providing a directional gear assembly so as to be contained within the transmission housing at a location between the second shaft and the output shaft, the directional gear assembly including a first configuration in which the second shaft drives the output shaft in a first rotational direction, a second configuration in which the second shaft drives the output shaft in a second rotational direction that is opposite to the first rotational direction, and a third configuration in which the output shaft is disconnected from the second shaft.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

I. Overall Watercraft

Figure 1:
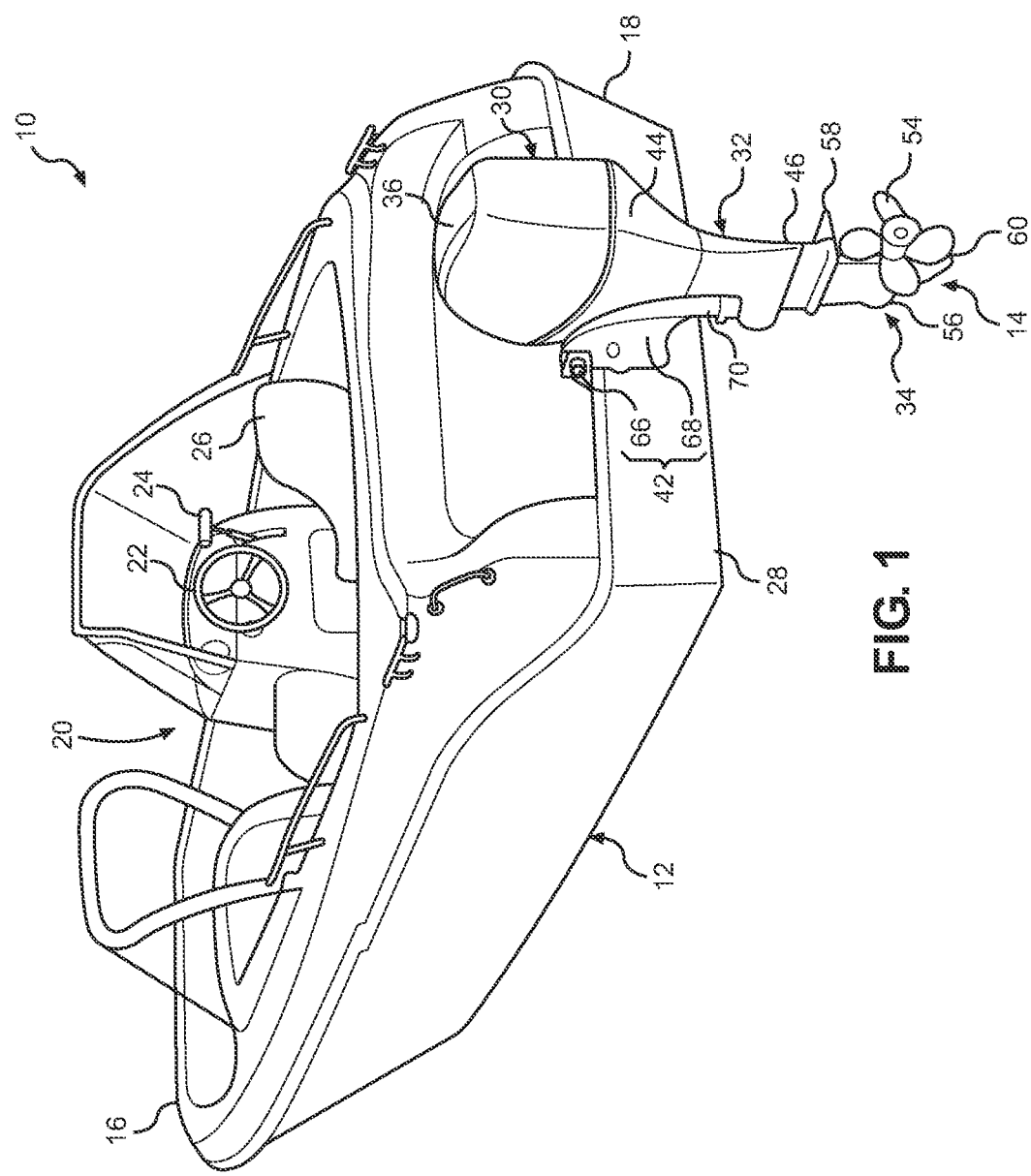
FIG. 1 is a rear perspective view of a watercraft in accordance with the disclosed subject matter.

FIG. 1 illustrates a watercraft 10 made in accordance with the principles of the disclosed subject matter. The watercraft 10 can include a hull 12 and an outboard motor 14. The hull 10 can include a bow 16, a stern 18 and a cockpit 20. The cockpit 20 can be located at any appropriate position of the hull 12 between the bow 16 the stern 18. The cockpit 20 can include a steering wheel 22, a throttle/trim control 24, and at least one seat 26. The steering wheel 22 and the throttle/trim control 24 can be connected to the outboard motor 14 in any appropriate manner that can effect adjustment of the operating condition(s) such as but not limited to turning on/off operation of the outboard motor 14, adjusting the speed, trim angle and/or steering angle of the outboard motor 14. The stern 18 can include a transom 28. The outboard motor 14 can be mounted to the transom 28.

II. Overall Outboard Motor

Referring to FIG. 1, the outboard motor 14 can include an upper portion 30, a middle portion 32 and a lower portion 34. As will be explained in detail below, the outboard motor 14 can include a drive assembly that extends from the upper portion 30, through the middle portion 32, to the lower portion 34.

Figure 2:
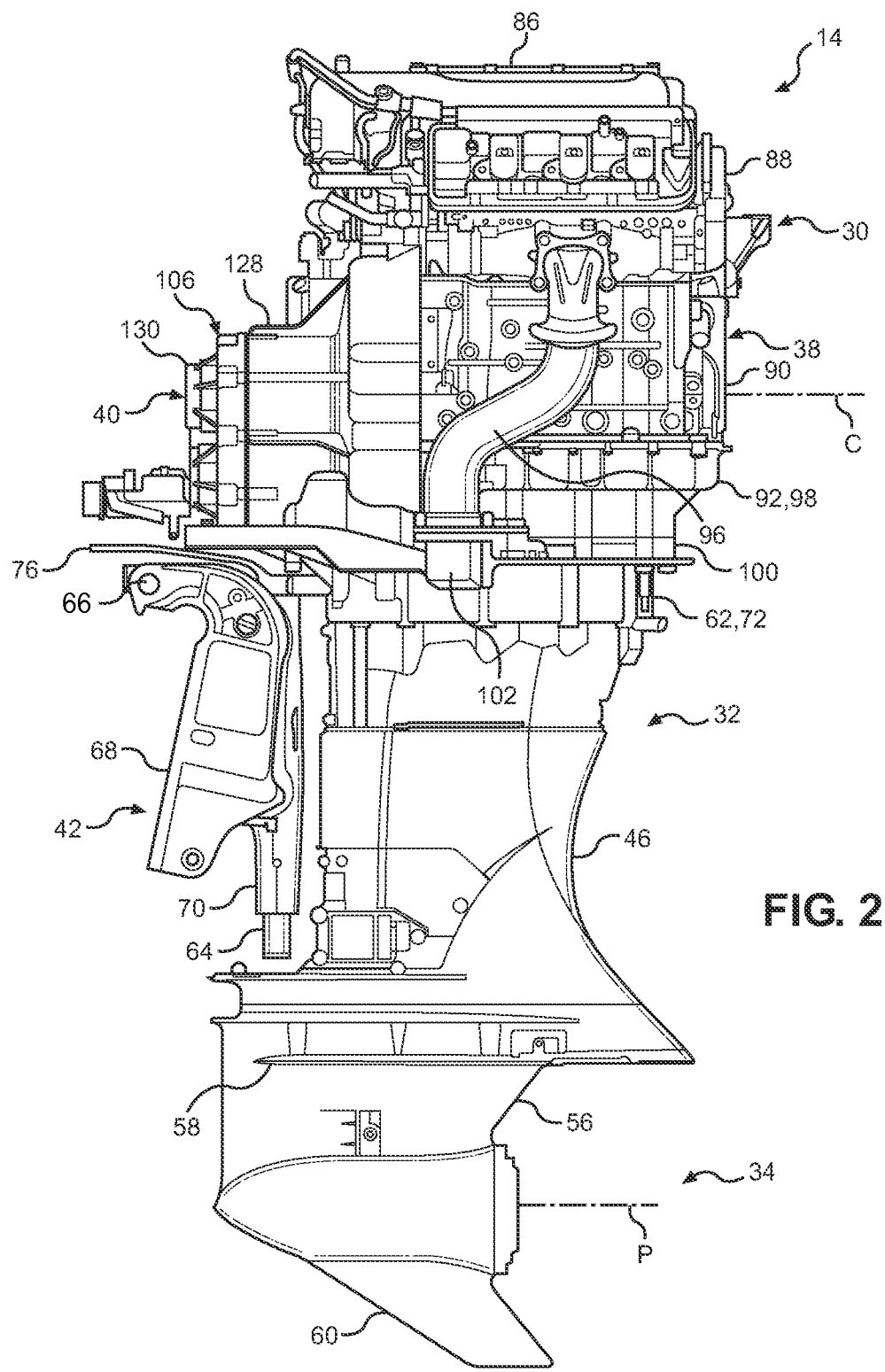
FIG. 2 is side view of a partially disassembled outboard motor in accordance with the disclosed subject matter.

The upper portion 30 of the outboard motor 14 can include an engine cover 36. FIG. 2 shows the outboard motor 14 of FIG. 1 with the engine cover 36 removed. The drive assembly can include an engine 38 and a transmission 40. The engine cover 36 can cover the engine 38 and the transmission 40.

Figure 3:
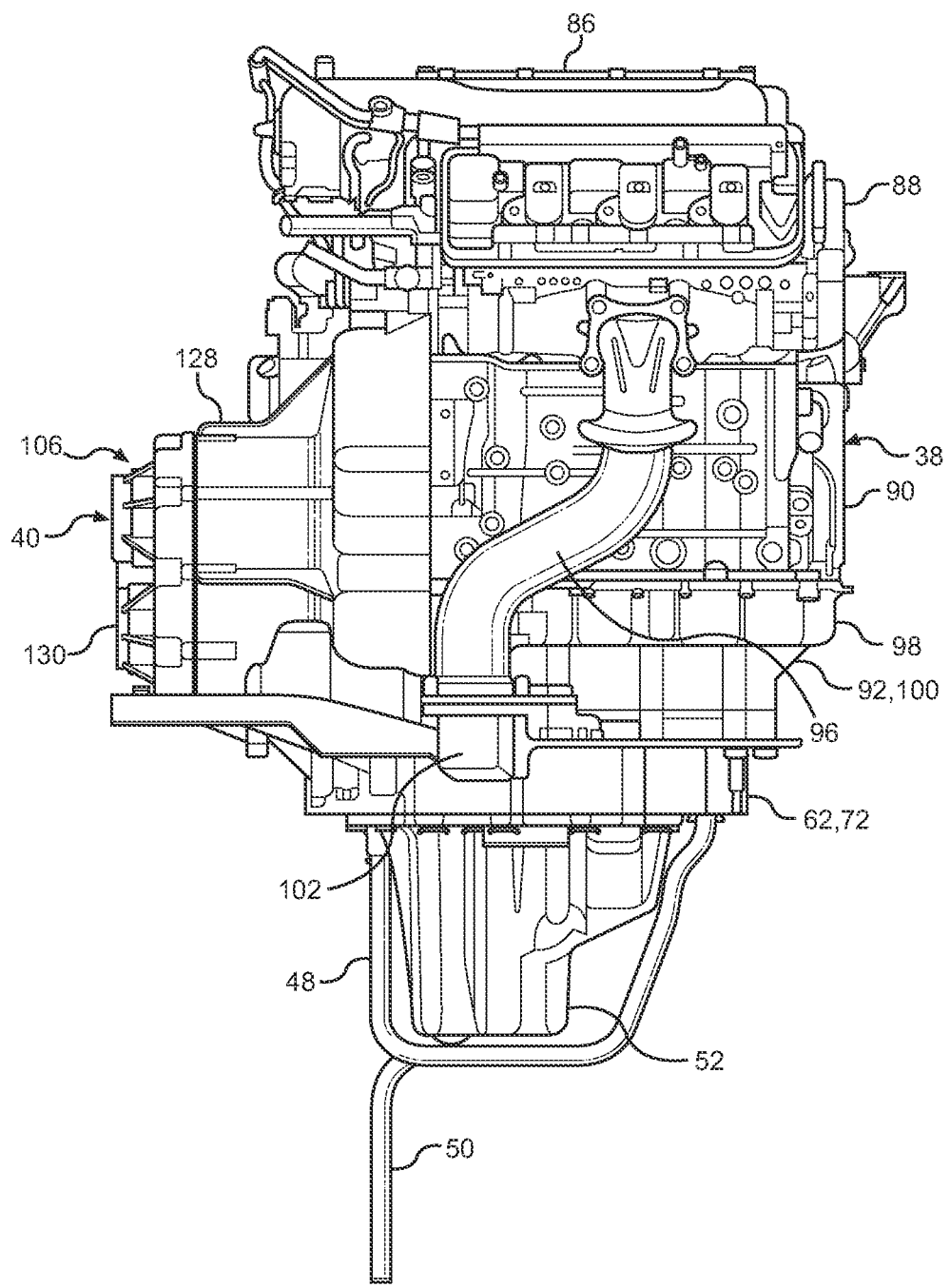
FIG. 3 is a side view of an upper assembly of the outboard motor of FIG. 2.

Referring to FIG. 1, the middle portion 32 of the outboard motor 14 can include a mounting assembly 42, a first middle cover 44 and a second middle cover 46. The mounting assembly will be described in further detail below. The first middle cover 44 is omitted from FIG. 2 to show internal structures of the outboard motor 14. As shown in FIG. 3, the middle portion 32 can include fluid conduits 48, 50 and an oil pan 52. The fluid conduits 48, 50 can be in fluid communication with the internal combustion engine 38 and the body of water in which the watercraft is operating. The oil pan 52 can contain a supply of oil for the internal combustion engine 38, and/or the transmission 40, and/or other component(s) of the drive assembly. As will be discussed in detail below, the middle portion 32 can include a middle portion of the drive assembly that extends from the transmission 40 to the lower portion 34 of the outboard motor 14.

Referring to FIGS. 1 and 2, the lower portion 34 of the outboard motor 14 can include a propeller 54, a gear housing 56, an anti-ventilation plate 58 and a skeg 60. The propeller 54 is omitted from FIG. 2 for simplicity and clarity of the drawing. The drive assembly can include the propeller 54.

In an exemplary embodiment, the anti-ventilation plate 58 and/or the skeg 60 can be integrally formed with the gear housing 56. Embodiments are intended to include the gear housing 56, the anti-ventilation plate 58 and/or the skeg 60 formed as separate elements that are connected together in any appropriate manner such as but not limited to mechanical fasteners, welding, adhesive, friction fit, etc. As will be discussed in further detail below, the lower portion 34 of the outboard motor 14 can include a lower portion of the drive assembly. The gear housing 56 obstructs the view of the lower portion of the drive assembly in FIGS. 1 and 2.

III. Mounting Assembly

Referring to FIGS. 1 and 2, the mounting assembly 42 can include a mounting member 62, a first shaft 64, a second shaft 66, a pair of brackets 68, and a shaft housing 70. The second shaft 66 is obstructed from view in FIG. 2 and the right-side bracket 68 is obstructed from view in FIGS. 1 and 2. However, it is to be understood that the right-side bracket 68 can be a mirror image of the left-side bracket 68. The brackets 68 can be connected to the transom 28 in any appropriate manner such as but not limited to mechanical fasteners.

Figure 4:
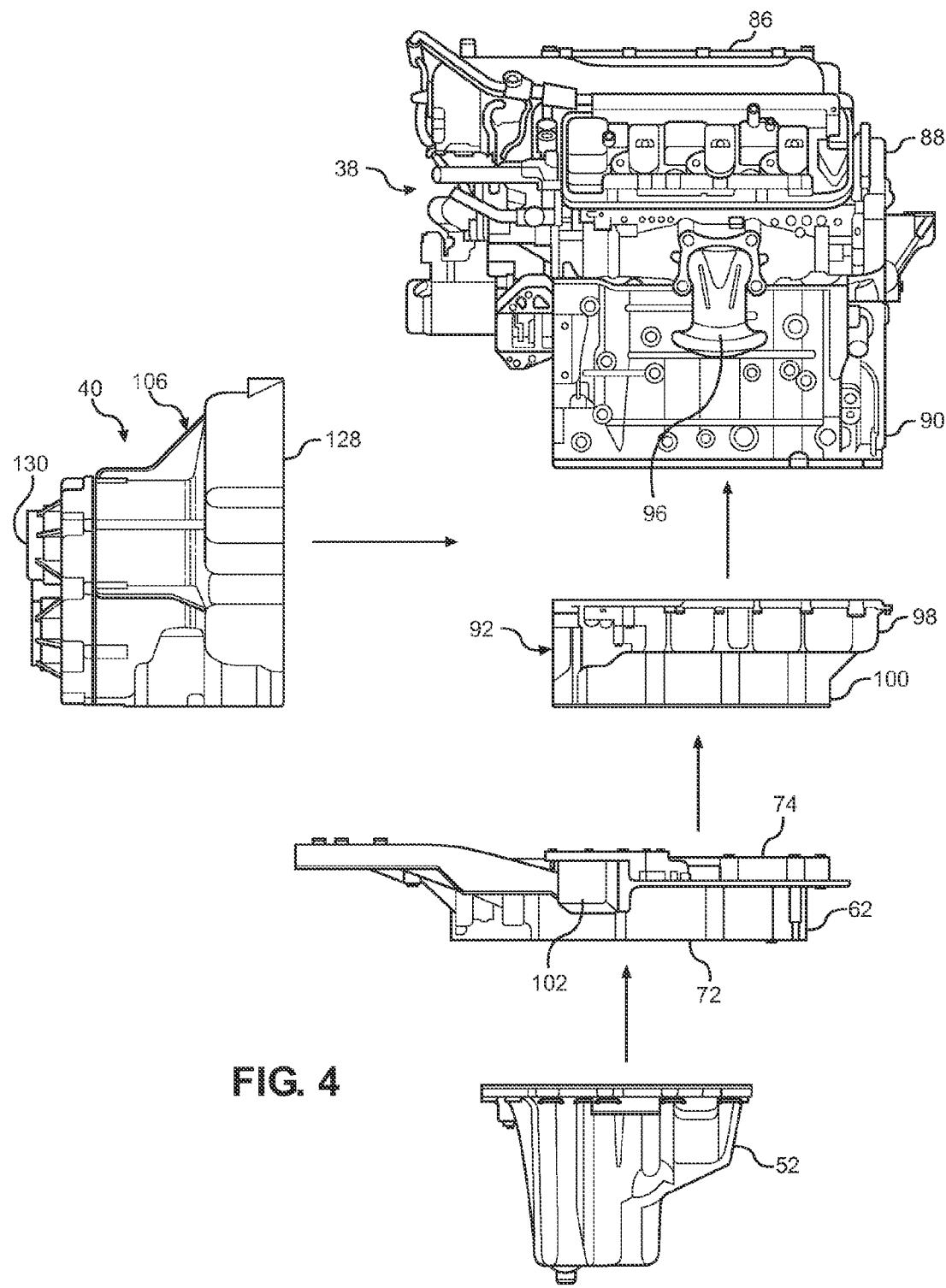
FIG. 4 is an exploded view of FIG. 3.

Referring to FIGS. 2-4, the mounting member 62 can support the internal combustion engine 38 and the transmission 40. The top of the oil pan 52 can be connected to the bottom of the mounting member 62 in any appropriate manner such as but not limited to bolts.

The mounting member 62 can include a main portion 72, a seat 74 and an arm 76. The arm 76 is omitted from FIGS. 3 and 4 for simplicity and clarity of the drawing views. Comparing FIGS. 2-4, the seat 74 can be connected to the engine 38 and the transmission 40 in any appropriate manner such as but not limited to bolts.

The shaft housing 70 can receive the first shaft 64 and the second shaft 66. The second shaft 66, the shaft housing 70 and the brackets 68 can be connected together in any appropriate manner that permits the shaft housing 70 to pivot about the axis of the second shaft 66. In an exemplary embodiment, the second shaft 66 can be fixed to the shaft housing 70 and rotatably supported by the brackets 68.

The first shaft 64 can extend in a direction that is substantially orthogonal to the second shaft 66. The first shaft 64 can extend in a substantially vertical direction when the watercraft 10 is in a level attitude and the outboard motor 14 is in a neutral trim position. The first shaft 64 can be non-rotatably connected to the arm 76. The shaft housing 70 can pivot about the first shaft 64. This pivoting motion can change angle of the propeller axis P relative to the hull 12 in order to change the watercraft's heading when traveling through the body of water.

The second shaft 66 can extend in a transverse direction of the watercraft 10. The second shaft 66 can extend in a substantially horizontal direction when the watercraft 10 is substantially level side-to-side. The remainder of the outboard motor 14 can pivot about the second shaft 66 to change angle of the propeller axis P relative to the hull 12. This pivoting motion can be effective to change the watercraft's attitude in the water to achieve reduced or the least resistance for the given water conditions and operational conditions of the watercraft. For example, under hard acceleration, the lower portion 34 of the outboard motor 14 can be pivoted about the second shaft 66 toward the water surface (referred to as a trimmed out position). This orientation can raise the bow 16 out of the water, thereby reducing the surface area of the hull 12 in contact with the water, thereby reducing the resistance to movement to the watercraft. Alternatively, the lower portion 34 can be pivoted about the second shaft 66 toward the water surface when travelling in shallow water to reduce or prevent damage to the propeller 36.

IV. Drive Assembly

As stated above, the drive assembly can include the internal combustion engine 38 and the transmission 40. The internal combustion engine 38 can be oriented in the outboard motor 14 to have a crankshaft axis C substantially parallel to a propeller axis P. The propeller 54 can rotate about the propeller axis P. It should be understood that the propeller axis P could be oriented at an acute angle of 20 degrees or less relative to the crankshaft axis C in order to provide a predetermined trim angle for the outboard motor 14. In such an arrangement, the crankshaft axis C can be considered to be substantially parallel to the propeller axis P. In other words, the crankshaft axis C can be considered to be substantially parallel to the propeller axis P if the included angle is within the range of −20 degrees to 20 degrees.

Figure 5:
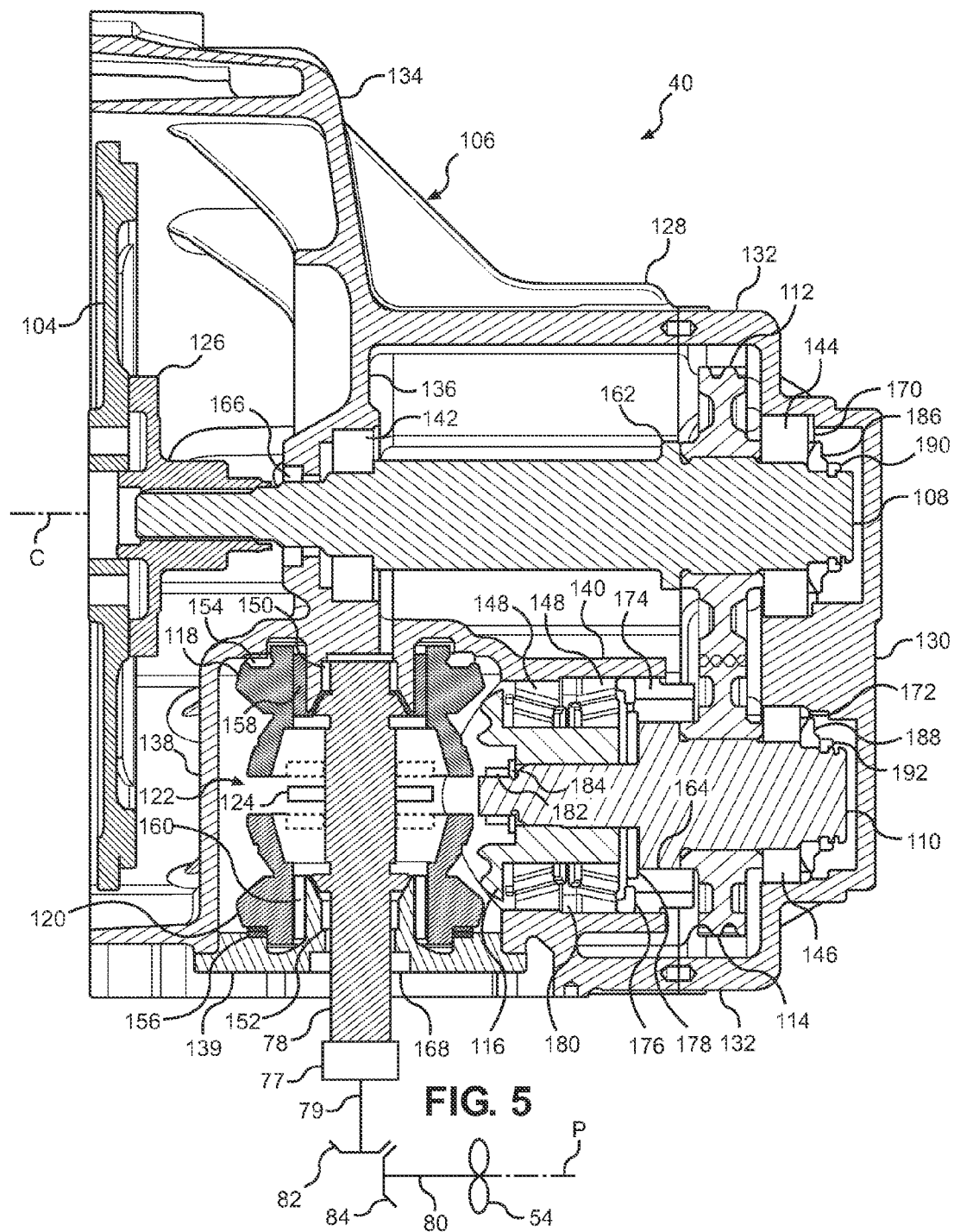
FIG. 5 includes a cross-sectional view of an exemplary embodiment of a transmission of a drive assembly and a schematic view of another portion of the drive assembly for the outboard motor of FIG. 2.

FIG. 5 includes a cross-sectional view of the transmission 40 and schematic view of a portion of the drive assembly. The drive assembly can include a coupling 77, an output shaft 78, an intermediate shaft 79, a propeller shaft 80, first bevel gear 82 and second bevel gear 84. FIG. 5 schematically illustrates the coupling 77, intermediate shaft 79, propeller shaft 80, first bevel gear 82 and second bevel gear 84

The output shaft 78 can extend substantially perpendicular to the crankshaft axis C. The output shaft 78 can extend substantially perpendicular to the propeller shaft axis P if the angle defined between the crankshaft axis C and the propeller axis P is within the range of −20 degrees to 20 degrees. The output shaft 78 can extend from the transmission 40. The output shaft 78 can include a first end rotatably supported within the transmission 40, and a second end rotatably supported by the transmission 40 and extending into the middle portion 32 of the outboard motor 14.

The coupling 77 can connect the second end of the output shaft 78 to the first end of the intermediate shaft 79. The coupling 77 can be any appropriate torque transmitting coupling that can permit the output shaft 78 to rotate the intermediate shaft 79. In an exemplary embodiment, the coupling 77 can be a sleeve having internal splines that engage external splines formed on the appropriate ends of the shafts 78, 79. The coupling 77 can be fixed to each of the shafts 78, 79 in appropriate manner, such as but not limited to mechanical fasteners, welding, interference fit, adhesive, etc., that can fix the location of the coupling 77 on each of the shafts 78, 79.

In an exemplary embodiment, the coupling 77 can be configured to removably connect the output shaft 78 to the intermediate shaft 79. This exemplary removable coupling 77 can facilitate maintenance and repair of the outboard motor 14. For example, this exemplary coupling 77 can avoid the need to disassemble the entire outboard motor 14, or some or all of the transmission 40 in order to service and/or replace the middle portion 32 and/or the lower portion 34.

The intermediate shaft 79 can extend from the coupling 77, through the middle portion 34 of the outboard motor 14, and to the propeller shaft 80. The intermediate shaft can include a second end that can be adjacent the propeller shaft 80. The first bevel gear 82 can be connected to rotate with the intermediate shaft 79. The first bevel gear 82 can be connected on the intermediate shaft 79 adjacent the second end of the intermediate shaft 79.

The propeller shaft 80 can be rotatably supported within the gear housing 56 in any appropriate manner. The propeller shaft 80 can extend from the output shaft 78 to the propeller 54 in a direction parallel to the propeller axis P. The propeller shaft 80 can include a first end and a second end. The second bevel gear 84 can be connected to rotate with the propeller shaft 80. The second bevel gear can be connected on the propeller shaft 80 adjacent the first end of the propeller shaft 80. The propeller 54 can be connected to rotate with the propeller shaft 80. The propeller 54 can be connected on the propeller shaft 80 adjacent the second end of the propeller shaft 80.

The first bevel gear 82 can engage the second bevel gear 84. The first bevel gear 82 can drive the second bevel gear 84 when the transmission 40 drives the output shaft 78.

A. Engine

Returning to FIGS. 2-4, the internal combustion engine 38 can include an intake manifold 86, a cylinder head 88, a cylinder block 90, a lower housing 92 and an exhaust pipe 96.

The internal combustion engine 38 can include one or more combustion cylinders. If the engine 38 includes 2 or more combustion cylinders, the cylinders can be arranged in a in-line configuration (also referred to as a straight configuration), a "V" configuration, a narrow angle "V" configuration, or in an opposed configuration (also referred to as a flat configuration or a boxer configuration). In an exemplary embodiment, the engine 38 can be configured as a V-6 engine having six cylinders arranged in two banks of three cylinders, where the banks are arranged to form a generally V-shape. It is to be understood that in this configuration the cylinder block 90 includes both banks of cylinders, and FIGS. 2-4 show the cylinder head 88 and the exhaust pipe 96 of one bank of cylinders. The cylinder head 88 and the exhaust pipe 96 of the other bank of cylinders are obstructed from view in FIGS. 2-4.

The cylinder block 90 can include an upper surface and a lower surface opposite to the upper surface. The cylinder head 88 can be connected to the upper surface of the cylinder block 90 in any appropriate manner such as but not limited to bolts. The lower housing 92 can be connected to the lower surface of the cylinder block 90. The lower housing 92 can be connected to the cylinder block 90 in any appropriate manner such as but not limited to bolts.

The lower housing 92 can include a crankcase cover portion 98 and a riser portion 100. The crankcase cover portion 98 can cover the crankshaft from the bottom of the internal combustion engine 38. The riser portion 100 can have a predetermined height H set to space the cylinder block 90 a predetermined distance above the mounting member 62. The predetermined height H can be set to accommodate the transmission 40 on the mounting member 62. The lower housing 92 can include an upper surface and a lower surface opposite to the upper surface. The cylinder block 90 can be connected to the upper surface of the lower housing 92. The lower surface of the lower housing 92 can be connected to the mounting member 62 in any appropriate manner such as but not limited to bolts.

The exhaust pipe 96 can extend into the middle portion 32 of the outboard motor 14. In particular, the exhaust pipe 96 can extend into a receptacle 102 formed in the mounting member 62. The exhaust pipe 96 can be in fluid communication with the propeller 54 via one or more passages formed in the middle portion 32 and the gear housing 56 to vent the exhaust gas produced by the internal combustion engine 38 out of the outboard motor 14.

Referring to FIG. 5, the internal combustion engine can include a crankshaft (not shown) and a flywheel 104. The crankshaft can be housed between the cylinder block 90 and the lower housing 92. The crankshaft can extend along the crankshaft axis C. The crankshaft can be connected to the flywheel 104 in any appropriate manner, such as but not limited to bolts, to rotate the flywheel 104. As will be discussed in detail below, the flywheel 104 can be connected to the transmission to rotate at least one internal component of the transmission 40.

Referring to FIG. 5, the flywheel 104 can include a boss 126. In an exemplary embodiment, the boss 126 can be formed as a separate element from the flywheel 104 that can be connected to the flywheel 104 in any appropriate manner such as but not limited to bolts and welding. Embodiments are intended to include the boss integrally formed with the remainder of the flywheel 104.

The exemplary embodiment of FIG. 5 shows the flywheel 104 as a solid unitary component. However, exemplary embodiments are intended to include a dual mass flywheel (also referred to as a divided flywheel damper, or as a flywheel damper).

The internal combustion engine 38 can be oriented in the outboard motor 14 in substantially the same manner as in a land vehicle. Thus, the internal combustion engine 38 can be an internal combustion engine originally designed for use in a land vehicle. Since the crankshaft axis C of the engine 38 can be oriented in substantially the same manner as in a land vehicle, part or component commonality with the land vehicle engine can be increased as compared to an engine oriented with its crankshaft axis that is not substantially parallel to the propeller axis. Thus, the cost of the engine 38 can be reduced by amortizing the costs over the combined production volume of the marine and land versions of the engine 38. Furthermore, the marine and land versions of the engine 38 can be assembled on the same production line with the same or substantially the same manufacturing equipment and processes. Thus, manufacturing costs can be reduced.

B. Transmission

Referring to FIGS. 2-5, the transmission 40 can include a transmission housing 106, a first gear assembly and a forward-neutral-reverse assembly. The first gear assembly and the forward-neutral-reverse assembly can be contained within the housing 106. By including the forward-neutral-reverse assembly within the transmission 40, the size of the lower portion 34 of the outboard motor 14 can be reduced. This reduced size can reduce the drag on the lower portion 34. As a result, fuel consumption can be reduced and/or performance can be enhanced or improved. As will be described below, the transmission 40 can include any appropriate configuration for the first gear assembly and the forward-neutral-reverse assembly that can provide a reverse speed ratio and at least one forward speed ratio.

Gear Assemblies

FIG. 5 illustrates an exemplary embodiment of a transmission 40 for use in the outboard motor 14. The transmission 40 can include a first shaft 108, a second shaft 110, a first gear 112, a second gear 114, a pinion gear 116, a reverse gear 118, a forward gear 120 and a selector assembly 122. The first gear assembly can include the first and second gears 112, 114. The forward-neutral-reverse assembly can include the pinion gear 116, the reverse gear 118, the forward gear 120 and the selector assembly 122.

As will be discussed in detail below, the first shaft 108, the second shaft 110, the first gear 112, the second gear 114, the pinion gear 116, the reverse gear 118 and the forward gear 120 can be supported within the transmission housing 106 so that these components can rotate about a respective axis. The first shaft 108 and the second shaft 110 can extend in a direction substantially parallel to the crankshaft axis C and the propeller axis P. As will be discussed in detail below, the selector assembly 122 can include a portion contained within the transmission housing 106 and a portion external to the transmission housing 106.

The output shaft 78 can extend into the transmission housing 106 in a direction substantially perpendicular to the direction in which the second shaft 112 extends. As will be discussed below, the output shaft 78 can include a first end supported within the transmission 40 so that the output shaft 78 can rotate.

The first gear 112 and the second gear 114 can include a plurality of teeth. The teeth of the first gear 112 can mesh with the teeth second gear 114 so that the first gear can rotate the second gear 114. The first and second gears 112, 114 can include any number of teeth that are appropriate to achieve a first speed ratio that can provide the performance desired for the transmission 40 and for the outboard motor 14. In an exemplary embodiment, the first gear 112 can have a greater number of teeth than that of the second gear 114. The teeth of first and second gears 112, 114 can be configured in any appropriate manner. In an exemplary embodiment, the first and second gears 112, 114 can be helical gears.

The first shaft 108 can include a first end and a second end. The boss 126 of the flywheel 104 can be connected to the first end of the first shaft 108 in any appropriate manner so that the flywheel 104 can rotate the first shaft 108. In an exemplary embodiment, the first end of the first shaft 108 can include external splines, and the boss 126 can include internal splines that can engage the external splines on the first end of the first shaft 108.

The first shaft 108 can include a reduced diameter portion adjacent the first end of the first shaft 108. The reduced diameter portion can extend into the boss 126 and can include the external splines that engage the internal splines of the boss 126.

The first gear 112 can be connected to the first shaft 108 at any appropriate position between the first end and the second end of the first shaft 108. The first gear 112 can be connected to the first shaft 108 in any appropriate manner so that the first shaft 108 can rotate the first gear 112. In an exemplary embodiment, the first shaft 108 can include external splines and the first gear 112 can include internal splines that can engage the external splines on the first shaft 108.

The second shaft 110 can include a first end and a second end. The second gear 114 can be connected to the second shaft 110 at any appropriate position between the first end and the second end of the second shaft 110 so that the teeth of the second gear 114 can mesh with the teeth of the first gear 112. As a result, the first gear 112 can rotate the second gear 114. The second gear 114 can be connected to the second shaft 110 in any appropriate manner so that the second gear 114 can rotate the second shaft 110. In an exemplary embodiment, the second shaft 110 can include external splines, and the second gear 114 can include internal splines that can engage the external splines on the second shaft 110.

1st & 2nd Shafts

The first shaft 108 can include a cylindrical projection 162. The cylindrical projection 162 can be located between the first and second ends of the first shaft 108. The cylindrical projection 162 can be closer to the second end than the first end of the first shaft 108. The first gear 112 can abut the cylindrical projection 162. The cylindrical projection 162 can reduce, impede, or prevent movement of the first gear 112 toward the first end of the first shaft 108. The cylindrical projection 162 can facilitate installation of the first gear 112 by providing a hard stop for the first gear 112.

The second shaft 110 can include a cylindrical projection 164. The cylindrical projection 164 can be located between the first and second end of the second shaft 110. The cylindrical projection 164 can reduce, impede, or prevent movement of the second gear 114 toward the second end of the second shaft 110. The cylindrical projection 164 can facilitate installation of the second gear 114 by providing a hard stop for the second gear 114. The cylindrical projection 164 can be aligned with the cylindrical projection of the first shaft 108 to facilitate alignment of the first and second gears 112, 114.

F-N-R

The pinion gear 116 can abut the cylindrical projection 164 on a side opposite to the second gear 114. The cylindrical projection 164 can reduce, impede, or prevent movement of the pinion gear 116 toward the first end of the second shaft 110. The cylindrical projection 164 can locate the pinion gear 116 relative to the second end of the second shaft 110 so that the pinion gear 116 can be aligned with the reverse and forward gears 118, 120.

The pinion gear 116 can be connected to the second shaft 110 at any appropriate position between the first end and the second end of the second shaft 110. The pinion gear 116 can be connected to the second shaft 110 in any appropriate manner so that the pinion gear 116 can rotate the second shaft 110. In an exemplary embodiment, the second shaft 110 can include external splines and the pinion gear 116 can include internal splines that can engage the external splines on the second shaft 110.

Each of the pinion gear 116, the reverse gear 118 and the forward gear 120 can include a plurality of teeth. The teeth of the pinion gear 116 can mesh with the teeth of the reverse gear 118 and the teeth of the forward gear 118 so that the pinion gear 116 can rotate of the reverse gear 118 and the forward gear 120 simultaneously. The third and reverse gears 116, 118 can include any number of teeth that are appropriate to achieve a reverse speed ratio that can provide the performance desired for the transmission 40 and the outboard motor 14. The pinion and forward gears 116, 120 can include any number of teeth that are appropriate to achieve a forward speed ratio that can provide the performance desired for the transmission 40 and the outboard motor 14. The teeth of the pinion, reverse and forward gears 116, 118, 120 can be configured in any appropriate manner.

The pinion, reverse and forward gears 116, 118, 120 can be bevel gears that can accommodate the substantially perpendicular relationship between the second shaft 110 and the output shaft 78. The pinion, reverse and forward gears 116, 118, 120 can be straight bevel gears, spiral bevel gears, or hypoid bevel gears.

The pinion gear 116 can be connected to the second shaft 110 in any appropriate manner so that the second shaft 110 can rotate the pinion gear 116. In an exemplary embodiment, the second shaft 110 can include external splines, and the pinion gear 116 can include internal splines that can engage the external splines on the second shaft 110.

The reverse gear 118 can be positioned along the output shaft 78 at any appropriate position adjacent the first end of the output shaft 78 so that the teeth of the reverse gear 118 can mesh with the teeth of the pinion gear 116.

The forward gear 120 can be positioned along the output shaft 78 at any appropriate position adjacent the first end of the output shaft 78 so that the teeth of the forward gear 120 can mesh with the teeth of the pinion gear 116.

Selector Assembly

FIG. 5 schematically illustrates a portion of the selector assembly 122 that is contained within the transmission housing 106. The selector assembly 122 can permit one or neither of the reverse gear 118 and the forward gear 120 to rotate the output shaft 78. In other words, the selector assembly 122 can selectively engage the output shaft 78 with one of the reverse gear 118 and the forward gear 120, and selectively disengage the output shaft 78 from one or both of the reverse gear 118 and the forward gear 120.

The selector assembly 122 can include an engagement member 124, an actuator assembly (not illustrated) and a selector device (not illustrated). FIG. 5 schematically illustrates the engagement member 124. The engagement member 124 can be any appropriate structure or assembly that can selectively engage and disengage a gear to a shaft, such as but not limited to a dog clutch (with or without a synchronizer mechanism) or a friction clutch. The friction clutch can include one or more friction plates. The actuator assembly can include any appropriate mechanical, hydraulic or by-wire assembly or system that can connect the selector device to the engagement member 124. The selector device can be any appropriate device such as but not limited to a pivotable lever, one or more electrical switches, or a rotatable handle. In an exemplary embodiment, the selector assembly 122 can include a dog clutch splined to the output shaft 78, a mechanical linkage connected to the dog clutch and a selector lever adjacent to the steering wheel 22 (FIG. 1) connected to the mechanical linkage. In this exemplary embodiment, each of the reverse gear 118 and the forward gear 120 can include dog teeth that can be engaged by the dog teeth of the dog clutch.

An operator of the watercraft 10 can manipulate the selector device of the selector assembly 122 to cause the actuator assembly to displace the engagement member 124 into one of a forward position, a neutral position and a reverse position. FIG. 5 shows the engagement member 124 in the neutral position and each of the forward position and the reverse position in phantom.

The engagement member 124 can connect the forward gear 120 to the output shaft 78 if the engagement member 124 is in the forward position. The engagement member 124 can connect the reverse gear 118 to the output shaft 78 if the engagement member 124 is in the reverse position. The engagement member 124 can connect neither the reverse gear 118 nor the forward gear 120 to the output shaft 78 if the engagement member 124 is in the neutral position.

The engagement member 124 can be connected to the output shaft 78 in any appropriate manner that can permit the engagement member 124 to rotate with the output shaft 78 and to slide along the output shaft 78 between the reverse position and the forward position. In an exemplary embodiment, the output shaft 78 can include a square cross-sectional shape along the length of the output shaft 78 between the forward and reverse positions and the engagement member 124 can include a mating square bore. In another exemplary embodiment, the output shaft 78 can include external splines and the engagement member 124 can include mating internal splines.

Torque Path

During operation of the drive assembly, the crankshaft (not shown) of the internal combustion engine 38 can drive the flywheel 104. The flywheel 104 can drive the first shaft 108. The first shaft 108 can drive the first gear 112. The first gear 112 can drive the second gear 114. The second gear 114 can drive the second shaft 110. The second shaft 110 can drive the pinion gear 116. The pinion gear 116 can drive each of the reverse gear 118 and the forward gear 120.

If the reverse gear 118 or the forward gear 120 drives the output shaft 78, then the output shaft 78 can drive the first bevel gear 82 in the reverse or forward direction, respectively, the first bevel gear 82 can drive the second bevel gear 84 in a reverse or forward direction, respectively, the second bevel gear 84 can drive the propeller shaft 80 in the reverse or forward direction, respectively, and the propeller shaft 80 can drive the propeller 54 in the reverse or forward direction, respectively.

If the engagement member 124 engages neither the reverse gear 118 nor the forward gear 120, then the output shaft 78, the first bevel gear 82, the second bevel gear 84, the propeller shaft 80 and the propeller 54 can be idle when the internal combustion engine is operating.

Thus, the transmission 40 can effect an increase/decrease of the rotational speed input by the internal combustion engine's crankshaft and a decrease/increase in the torque input by the engine's crankshaft depending on the first speed ratio provided by the first and second gears 114, 116, the forward speed ratio provided by the pinion and forward gears 118, 122, and the reverse speed ratio provided by the pinion and reverse gears 118, 120. The transmission 40 also can permit the propeller 54 to idle if the engine 38 is operating. Further, the forward-neutral-reverse assembly can be contained within a transmission 40 located in the upper portion 30 of the outboard motor 14.

Transmission Housing

Referring to FIGS. 2-5, the transmission housing 106 can include a main housing 128 and a housing cover 130. The main housing 128 can include a first side connected to the cylinder block 90 and the lower housing 92, and a second side that is opposite to the first side and connected to the housing cover 130. The main housing 128 can be connected to the cylinder block 90 and to the lower housing 92 in any appropriate manner such as but not limited to bolts. The first side of the main housing 128 can be opened toward the cylinder block 90 and the lower housing 92. The second side of the main housing 128 can be opened toward the housing cover 130.

The housing cover 130 can be removably connected to the main housing 128 in any appropriate manner such as but not limited to bolts. The housing cover 130 can be removed from the main housing 128 to permit access to the internal components of the transmission 40 for maintenance, repair, and/or replacing one or more internal component(s) of the transmission 40.

Referring to FIG. 5, the housing cover 130 can include a central portion and an extension portion 132. The extension portion 132 can be configured as an annular wall or as an annular flange that extends from and encircles the central portion of the housing cover 130. The extension portion 132 can extend toward the opened second side of the main housing 128. The second end of the first and second shafts 108, 110 and can extend beyond the opened second side of the main housing 128. The first and second gears 112, 114 can lie entirely outside of the main housing. The extension portion 132 can extend along the first and second gears 112, 114 in order to close access to the first and second gears 112, 114. The extension portion 128 can be dimensioned in accordance with the maximum axial width of the first and second gears 112, 114. If the housing cover 130 is disassembled from the main housing 128, then the first and second gears 112, 114 can be fully exposed. As a result, the first and second gears 112, 114 can be more easily replaced, as necessary or desired.

It should be noted that exemplary embodiments are intended to include a portion of the first gear 112 and/or a portion of the second gear 114 lying outside of the main housing 128. Exemplary embodiments also are intended to include or otherwise cover the first gear 112 and/or the second gear 114 being contained within the main housing 128 adjacent the opened second end of the main housing 128.

The housing cover 130 and the cylindrical projections 162, 164 of the first and second shafts 108, 110, respectively, can facilitate installation of the first and second gears 112, 114, while the first and second shafts 108, 110 and the forward-neutral-reverse assembly remain within the transmission housing 106, and while the transmission 40 remains connected to the internal combustion engine 38. Thus, removal and installation of the first and second gears 112, 114 can be simplified as compared to an outboard motor that has a transmission located in the middle portion 32 of the outboard motor 14.

The main housing 128 can include an outer wall 134, a first wall 136, a second wall 138 and a third wall 140.

The outer wall 134 can define the perimeter of the main housing 128. The outer wall 134 can be opened at the first and second ends of the main housing 128.

The first and second walls 136, 138 can cooperate to divide the main housing 128 into a bell housing and a gear housing. The bell housing can receive the flywheel 104. In cooperation with the housing cover 130, the gear housing can receive the first gear assembly and the forward-neutral-reverse assembly.

The first wall 136 can extend inwardly from the outer wall 134 and inwardly from the top portion of the main housing 106 (as viewed in FIG. 5) and inwardly from the side portions of the main housing 106. The first wall 136 can be connected to the second wall 138 at a junction.

The first wall 136 can include a hole through which the first shaft 108 can extend into the bell housing. The first end of the first shaft 108 can lie on one side of the first wall 136 and the second end of the first shaft 108 can lie on the other side of the first wall 136. As will be discussed in detail below, the first wall 136 can support a portion of the first shaft 108 adjacent the first end of the first shaft 108.

The second wall 138 can extend inwardly from the outer wall 134 and inwardly from the bottom portion of the main housing 106 (as viewed in FIG. 5) and inwardly from the side portions of the main housing 106.

The third wall 140 can be connected to the junction of the first and second walls 136, 138. The third wall 140 can be connected to the outer wall 134. The third wall 140 can extend into the gear housing from the first and second walls 136, 138 and toward the housing cover 130. The third wall 140 can extend between the first shaft 108 and the second shaft 110. The third wall 140 can surround the second shaft 110.

The transmission housing 106 can include an opening in the main housing 128 and adjacent to the forward gear 120, and a second cover 139. The second cover 139 can close the opening. The second cover 139 can be removably connected to the main housing 128 in any appropriate manner such as but not limited to bolts. The second cover 139 can permit access to the forward-neutral-reverse assembly for maintenance, repair and/or replacement of the one or more components of the forward-neutral-reverse assembly. The second cover 139 can include a hole. The output shaft 78 can extend through the hole.

Bearings

The transmission 40 can include a first bearing 142, a second bearing 144, a third bearing 146, a fourth bearing 148, a fifth bearing 150, a sixth bearing 152, a seventh bearing 154, an eight bearing 156, a ninth bearing 158 and a tenth bearing 160.

The first and second bearings 142, 144 can support the first shaft 110 in the transmission housing 106, and can permit the first shaft 108 to rotate within the transmission housing 106. The bearings 142, 144 can be any appropriate type of rolling bearing such as but not limited to a ball bearing, a roller bearing, and a needle bearing, or any type of plain bearing (also referred to as a journal bearing or as a solid bearing). The first bearing 142 can be positioned adjacent the first end of the first shaft 108. The second bearing 144 can be positioned adjacent the second end of the first shaft 108. The first and second bearings 142, 144 can be slip-fit onto the first shaft 108. The first bearing 142 can be slip fit into a cylindrical recess formed in the first wall 136. The second bearing 144 can be connected to a cylindrical recess formed in the inner surface of the housing cover 130 with a slip-fit. The first and second bearings 142, 144 can be connected to the first shaft 108 with a slip-fit.

The first shaft 108 can include a reduced diameter portion that defines a cylindrical end face. The first bearing 142 can engage the reduced diameter portion and abut the cylindrical end face. The cylindrical end face can cooperate with the first bearing 142 and the cylindrical recess formed in the first wall 136 to locate the first shaft 108 in the main housing 128.

The third and fourth bearings 146, 148 can support the second shaft 110 in the transmission housing 106, and can permit the second shaft 110 to rotate within the transmission housing 106. The third and fourth bearings 146, 148 can be any appropriate type of rolling-element bearing such as but not limited to a ball bearing, a roller bearing, and a needle bearing, or any type of plain bearing (also referred to as a journal bearing or as a solid bearing). In an exemplary embodiment, the fourth bearing 148 can be a double-row tapered roller bearing. The third bearing 146 can be positioned adjacent the first end of the second shaft 110. The fourth bearing 148 can be positioned adjacent the second end of the second shaft 110. The third bearing 146 can be connected to the second shaft shaft 108 with a slip-fit. The third bearing 146 can be connected to another cylindrical recess formed in the inner surface of the housing cover 130 with a slip-fit. The fourth bearing 148 can be connected to the pinion gear 116 with a press-fit.

The fifth and sixth bearings 150, 152 can support the output shaft 78 in the transmission housing 106, and can permit the output shaft 78 to rotate within the transmission housing 106. The fifth bearing 150 can be positioned at the first end of the output shaft 78. The sixth bearing 152 can be positioned inward of the first end of the output shaft 78. The fifth and sixth bearings 150, 152 can be any appropriate type of rolling-element bearing such as but not limited to a ball bearing, a roller bearing, and a needle bearing, or any type of plain bearing (also referred to as a journal bearing or as a solid bearing). In an exemplary embodiment, the fifth and sixth bearings 150, 152 can be roller bearings. The fifth and sixth bearings 150, 152 can be connected to the output shaft 78 with a press-fit.

The seventh bearing 154 can support the reverse gear 118 in the transmission housing 106, and can permit the reverse gear 118 to rotate within the transmission housing 106. The seventh bearing 154 can engage an end face of the reverse gear 118. The seventh bearing 154 can engage each of the second and third walls 138, 140

The eighth bearing 156 can support the forward gear 120 in the transmission housing 106, and can permit the forward gear 120 to rotate within the transmission housing 106. The eighth bearing 156 can engage an end face of the forward gear 120. The eighth bearing 156 can engage an annular recess formed in an inner surface of the second cover 139.

A shim can be placed between each of the seventh and eighth bearings 154, 156. The shims can provide a tight engagement between the transmission housing 106, the bearings 154, 156 and the reverse and forward gears 118, 120. The shims can be replaced to compensate for wear on the 106 housing, the seventh and eighth bearings 154, 156 and/or the reverse and forward gears 118, 120.

The seventh and eighth bearings 154, 156 can be any appropriate type of rolling-element bearing such as but not limited to a ball bearing, a roller bearing, and a needle bearing, or any type of plain bearing (also referred to as a journal bearing or as a solid bearing). In an exemplary embodiment, the seventh and eighth bearings 154, 156 can be needle bearings.

Since the pinion gear 116 can rotate both of the reverse gear 118 and the forward gear 120 simultaneously, the reverse and forward gears 118, 120 can be supported in the transmission housing 106 to selectively rotate relative to the output shaft 78. The transmission 40 can include a ninth bearing 158 and a tenth bearing 160 that can support the reverse and forward gears 118, 120, respectively, for rotation relative to the output shaft 78.

The main housing 128 can include an annular projection extending from the junction of the first, second and third walls 136, 138, 140 and toward the second cover. The second cover 139 can include an annular projection extending from the inner surface of the second cover 139 and toward the junction of the first, second and third walls 136, 138, 140. The ninth bearing 158 can be pressed onto the annular projection of the main housing 128. The tenth bearing 160 can be pressed onto the annular projection of the second cover 139.

Seals, Shims, Nuts & Retainers

The transmission 40 can include a first seal 166, a second seal 168, a first shim 170, a second shim 172, a nut 174, a first washer 176, a second washer 178, a spacer 180, a lock nut 182, a third washer 184, a third shim 186, a fourth shim 188, a first retainer 190 and a second retainer 192.

The first seal 166 can be mounted in a cylindrical recess formed in the first wall 136. The cylindrical recess can be formed around the hole in the first wall 136. The cylindrical recess can be concentric with the hole in the first wall 136. The first seal 166 can engage the cylindrical recess and the first shaft 108 to seal the hole in the first wall 136. The first seal 166 can be any appropriate seal formed in any appropriate shape from any appropriate material. In an exemplary embodiment, the first seal 166 can be an O-ring.

The second seal 168 can be mounted in a cylindrical recess formed in the second cover 139. The cylindrical recess can be formed around the hole in the second cover 139. The cylindrical recess can be concentric with the hole in the second cover 139. The second seal 168 can engage the cylindrical recess and the output shaft 78 to seal the hole in the second cover 139. The second seal 168 can be any appropriate seal formed in any appropriate shape from any appropriate material. In an exemplary embodiment, the second seal 168 can be an O-ring.

The first shim 170 can be placed between the second bearing 144 and the housing cover 130. The first shim 170 can provide a tight engagement between the housing cover 130, the second bearing 144 and the first gear 112. The first shim 170 can be replaced to compensate for wear on the housing cover 130, the second bearing 144 and/or the first gear 112.

The second shim 172 can be placed between the third bearing 146 and the housing cover 130. The second shim 172 can provide a tight engagement between the housing cover 130, the third bearing 146 and the second gear 114. The second shim 172 can be replaced to compensate for wear on the housing cover 130, the third bearing 146 and/or the second gear 114.

Each of the first and second shafts 108, 110 can include a circumferential groove adjacent the second end. The third and fourth shims 186, 188 and the retainers 190, 192 can be connected to a respective one of the grooves of the first and second shafts 108, 100. The retainers 190, 192 can be connected to grooves of the first and second shafts 108, 110 by a snap-fit. The retainers 190, 192 can abut the respective third and fourth shims 186, 188 and can maintain the position of the respective shims 186, 188 relative to the second ends of the first and second shafts 108, 110. The third and fourth shims 186, 188 can cooperate with the first and second shims 170, 172 to locate the respective bearings 144, 146 on the respective shafts 108, 110.

The nut 174 can include external threads that can engage internal threads formed in the third wall 140 of the main housing 128. The first washer 176 can abut the fourth bearing 148, and the nut 174 can abut the washer 176. The nut 174 can be tightened to maintain engagement of the teeth of the pinion gear 116 with the teeth of the reverse and forward gears 118, 120.

The second washer 178 can abut the cylindrical projection of the second shaft 110. The second washer 178 can be located between the fourth bearing 148 and the cylindrical projection of the second shaft 110.

The spacer 180 can be located between each row bearings of the fourth bearing 148. The spacer 180 can abut the third wall 140 of the main housing 128.

The second shaft 110 can include a reduced diameter portion extending from the first end of the second shaft 110 and toward the second end of the second shaft 110. The reduced diameter portion of the second shaft 110 can include external threads that can engage internal threads of the lock nut 182. The lock nut 182 can be tightened to maintain the position of the pinion gear 116 relative to the first end of the second shaft 110.

The third washer 184 can abut the cylindrical face of the second shaft 110 adjacent to the reduced diameter portion of the second shaft 110. The third washer 184 can abut the lock nut 182.

V. Alternative Embodiments

While certain embodiments of the invention are described above, and FIGS. 1-5 disclose the best mode for practicing the various inventive aspects, it should be understood that the invention can be embodied and configured in many different ways without departing from the spirit and scope of the invention.

For example, embodiments are disclosed above in the context of a single speed ratio transmission. However, embodiments are intended to include or otherwise cover any type of transmission such as but not limited to a single speed ratio transmission, a stepped-ratio transmission that includes a plurality of discrete speed ratios, and a continuously variable speed ratio transmission. Exemplary embodiments also are intended to include a transmission configured with a sliding-mesh gear arrangement in which the one or more gears can slide along a shaft to selectively engage at least one other gear, or in a constant-mesh gear arrangement in which the teeth of a pair of gears constantly mesh with each other and at least one of the pair of gears is selectively connected to a shaft, or in an epicylic gear arrangement (also referred to as a planetary gear arrangement) in which at least one gear can rotate about the axis of another gear and at least one of the gears can be selectively held stationary. Exemplary embodiments also are intended to include a planetary gear assembly and a single bevel gear for each of the second shaft and the output shaft that replaces the forward-neutral-reverse assembly of FIG. 5. However, the above alternative embodiments are merely provided for exemplary purposes, and as indicated above, embodiments are intended to cover any type of outboard motor disclosed above.

In the exemplary embodiment of FIG. 5, the shafts 108, 110 are arranged in a substantially vertical alignment. However, embodiments are intended to include or otherwise cover include any appropriate positioning of the second shaft 110 relative to the first shaft 108.

In the exemplary embodiment of FIG. 5, the forward gear 120 and the reverse gear 118 are mounted about the output shaft 78, the pinion gear is mounted on the second shaft 110, and the engagement member 124 slidably mounted on the output shaft 78. However, embodiments are intended to include or otherwise cover a forward gear and a reverse gear mounted on the second shaft, the pinion gear mounted on the output shaft, and an engagement member slidably mounted on the second shaft.

Exemplary embodiments are intended to include or otherwise cover any type of ignition system (compression ignition or spark ignition), any type of engine cycle (two-stroke or four-stroke), and any type of air intake system (normally aspirated or forced induction) for the internal combustion engine.

Exemplary embodiments are also intended to cover any type of steering, throttle and trim control system. For example, any appropriate one of a mechanical linkage system, a cable system, a hydraulic system, an electro-hydraulic system, and a by-wire system; or any appropriate combination thereof can connect the steering wheel and the throttle/trim control to the outboard motor. In another exemplary embodiment, the steering wheel and the throttle/trim control can be replaced with a tiller connected directly to the outboard motor above the second shaft so that displacement of the tiller can effect the direction of travel of the watercraft and the trim angle of the propeller. The tiller can include a throttle control so that the speed of the engine, and ultimately the speed of the propeller, can be adjusted.

Exemplary embodiments are further intended to cover omission of any one or both of the engine cover and the middle cover.

While the subject matter has been described in detail with reference to exemplary embodiments thereof, it will be apparent to one skilled in the art that various changes can be made, and equivalents employed, without departing from the scope of the invention. All related art references discussed in the above Background section are hereby incorporated by reference in their entirety.

What is claimed is:

1. An outboard motor for propelling a watercraft along a body of water, the outboard motor comprising:
    a propeller including at least one blade configured to impart thrust to an immediate portion of the body of water if the propeller rotates in the immediate portion of the body of water;
    a propeller shaft fixed to the propeller and extending in a first direction;
    an output shaft extending substantially perpendicular to the first direction and selectively driving the propeller shaft;
    an internal combustion engine including an engine block and a crankshaft axis, the crankshaft axis extends substantially parallel to the first direction; and
    a transmission including:
        a transmission housing abutting the engine block;
        a first shaft extending substantially parallel to the first direction, and contained within the transmission housing;
        a second shaft extending substantially parallel to the first direction and contained within the transmission housing;
        a first gear contained within the transmission housing and connected to the first shaft;
        a second gear contained within the transmission housing and connected to the second shaft and engaging the first gear; and
        a directional gear assembly contained within the transmission housing at a location between the second shaft and the output shaft, the directional gear assembly including a first configuration in which the second shaft drives the output shaft in a first rotational direction, a second configuration in which the second shaft drives the output shaft in a second rotational direction that is opposite to the first rotational direction, and a third configuration in which the output shaft is disconnected from the second shaft.

2. The outboard motor according to claim 1, wherein the directional gear assembly includes a pinion gear, a forward gear, a reverse gear, and a coupling assembly, the pinion gear being fixed to one of the second shaft and the output shaft, each of the forward gear and the reverse gear being selectively engagable with the other of the second shaft and the output shaft.

3. The outboard motor according to claim 2, wherein the coupling assembly engages the forward gear with the other of the second shaft and the output shaft if the coupling assembly is in the first configuration, the coupling assembly engages the reverse gear with the other of the second shaft and the output shaft if the coupling assembly is in the second configuration, and the coupling assembly disengages both of the forward gear and the reverse gear from the other of the second shaft and the output shaft if the coupling assembly is in the third configuration.

4. The outboard motor according to claim 2, wherein each of the forward gear, the reverse gear, and the pinion gear are bevel gears.

5. The outboard motor according to claim 2, wherein the pinion gear engages the forward gear and the reverse gear simultaneously.

6. The outboard motor according to claim 1, wherein the output shaft includes a first portion that extends into the transmission housing and second portion that lies outside of the transmission housing.

7. The outboard motor according to claim 1, further comprising a lower housing connected to the engine block, and a mounting assembly configured to secure the outboard motor to the watercraft, the mounting assembly including a mounting member connected to the lower housing.

8. The outboard motor according to claim 7, wherein the lower housing includes a crankcase cover portion connected to the engine block and a riser portion connected to the mounting member.

9. The outboard motor according to claim 7, further comprising:
- an engine cover covering the engine block and the transmission housing;
- an middle cover covering the mounting member and a first portion of the output shaft; and
- a lower unit cover covering the propeller shaft and a second portion of the output shaft.

10. The outboard motor according to claim 1, further comprising a first bevel gear connected to the output shaft, and a second bevel gear connected to the propeller shaft and engaged with the first bevel gear.

11. A transmission on an outboard motor for propelling a watercraft along a body of water, the outboard motor including a propeller including at least one blade configured to impart thrust to an immediate portion of the body of water if the propeller rotates in the immediate portion of the body of water, a propeller shaft fixed to the propeller and extending in a first direction, an output shaft extending substantially perpendicular to the first direction and selectively driving the propeller shaft, and an internal combustion engine including a crankshaft axis extending substantially parallel to the first direction, the transmission comprising:
- a transmission housing arranged to abut the internal combustion engine;
- a first shaft arranged to be driven by the internal combustion engine, extending substantially parallel to the first direction, and contained within the transmission housing;
- a second shaft extending substantially parallel to the first direction and contained within the transmission housing;
- a first gear contained within the transmission housing and connected to the first shaft;
- a second gear contained within the transmission housing, connected to the second shaft, and engaging the first gear; and
- a directional gear assembly contained within the transmission housing at a location between the second shaft and the output shaft, the directional gear assembly including a first configuration in which the second shaft drives the output shaft in a first rotational direction, a second configuration in which the second shaft drives the output shaft in a second rotational direction that is opposite to the first rotational direction, and a third configuration in which the output shaft is disconnected from the second shaft.

12. The transmission according to claim 11, wherein the directional gear assembly includes a pinion gear, a forward gear, a reverse gear, and a coupling assembly, the pinion gear being fixed to one of the second shaft and the output shaft, each of the forward gear and the reverse gear being selectively engagable with the other of the second shaft and the output shaft.

13. The transmission according to claim 12, wherein the coupling assembly engages the forward gear with the other of the second shaft and the output shaft if the coupling assembly is in the first configuration, the coupling assembly engages the reverse gear with the other of the second shaft and the output shaft if the coupling assembly is in the second configuration, and the coupling assembly disengages both of the forward gear and the reverse gear from the other of the second shaft and the output shaft if the coupling assembly is in the third configuration.

14. The transmission according to claim 12, wherein each of the forward gear, the reverse gear, and the pinion gear are bevel gears.

15. The transmission according to claim 12, wherein the pinion gear engages the forward gear and the reverse gear simultaneously.

16. The transmission according to claim 11, wherein the output shaft includes a first portion and a second portion, and the transmission is configured to permit the output shaft to extend through the transmission housing so that the transmission housing receives the first portion of the output shaft and the second portion of the output shaft lies outside of the transmission housing.

17. The transmission according to claim 11, wherein the transmission housing includes a main housing and a housing cover removably connected to the main housing.

18. The transmission according to claim 17, wherein main housing includes an opened side, the housing cover closes the opened side if the housing cover is connected to the main housing, the first and second gears lie beyond the opened side, and the first and second gears are exposed if the housing cover is removed from the main housing.

19. The transmission according to claim 17, wherein the housing cover includes a central portion and an extension portion, and the extension portion extends toward the main housing.

20. A method of manufacturing an outboard motor for propelling a watercraft along a body of water, the method comprising:
- providing a propeller including at least one blade configured to impart thrust to an immediate portion of the body of water if the propeller rotates in the immediate portion of the body of water;
- fixing a propeller shaft to the propeller;
- extending the propeller shaft in a first direction;
- extending an output shaft substantially perpendicular to the first direction;
- providing an internal combustion engine including an engine block and a crankshaft axis;
- orienting the crank shaft axis to be substantially parallel to the first direction;
- abutting a transmission housing against the engine block;
- connecting a first shaft to the internal combustion engine, such that the first shaft extends substantially parallel to the first direction, and is contained within the transmission housing;
- extending a second shaft substantially parallel to the first direction and so as to be contained within the transmission housing;
- providing a first gear so as to be contained within the transmission housing and connected to the first shaft;
- providing a second gear so as to be contained within the transmission housing and connected to the second shaft and engaged with the first gear; and
- providing a directional gear assembly so as to be contained within the transmission housing at a location between the second shaft and the output shaft, the directional gear assembly including a first configuration in which the second shaft drives the output shaft in a first rotational direction, a second configuration in which the second shaft drives the output shaft in a second rotational direction that is opposite to the first rotational direction, and a third configuration in which the output shaft is disconnected from the second shaft.

* * * * *